US010037528B2

(12) United States Patent
Gardiner et al.

(10) Patent No.: US 10,037,528 B2
(45) Date of Patent: Jul. 31, 2018

(54) BIOMETRIC DEVICE UTILIZING FINGER SEQUENCE FOR AUTHENTICATION

(71) Applicant: Tactilis Sdn Bhd, Mont Kiara, Kuala Lumpur (MY)

(72) Inventors: Michael Gardiner, Kuala Lumpur (MY); Adriano Canzi, Los Angeles, CA (US)

(73) Assignee: Tactilis SDN BHD, Kuala Lumpur (MY)

( * ) Notice: Subject to any disclaimer, the term of this patent is extended or adjusted under 35 U.S.C. 154(b) by 557 days.

(21) Appl. No.: 14/603,703

(22) Filed: Jan. 23, 2015

(65) Prior Publication Data

US 2016/0217312 A1  Jul. 28, 2016

(51) Int. Cl.
G06K 5/00         (2006.01)
G06Q 20/40        (2012.01)
G06K 9/00         (2006.01)
G06Q 20/34        (2012.01)
H04L 29/06        (2006.01)

(52) U.S. Cl.
CPC ......... *G06Q 20/40* (2013.01); *G06K 9/00087* (2013.01); *G06K 9/00979* (2013.01); *G06Q 20/341* (2013.01); *G06Q 20/409* (2013.01); *G06Q 20/4093* (2013.01); *G06Q 20/40145* (2013.01); *H04L 63/0853* (2013.01); *H04L 63/0861* (2013.01)

(58) Field of Classification Search
CPC .... G07F 7/1008; G07F 7/1016; G06Q 20/341
USPC ................................................ 235/380, 382
See application file for complete search history.

(56) References Cited

U.S. PATENT DOCUMENTS

| 4,453,074 A | 6/1984 | Weinstein et al. |
| 4,582,985 A | 4/1986 | Loefberg |
| 4,725,719 A | 2/1988 | Oncken et al. |
| 4,747,147 A | 5/1988 | Sparrow |
| 4,910,521 A | 3/1990 | Mellon |

(Continued)

FOREIGN PATENT DOCUMENTS

| AU | 200238203 C | 11/2002 |
| AU | 757159 B2 | 2/2003 |

(Continued)

OTHER PUBLICATIONS

Patent Cooperation Treaty, International Search Report for PCT/US2016/000020, dated May 12, 2016, pp. 4-5.

(Continued)

*Primary Examiner* — Daniel St Cyr
(74) *Attorney, Agent, or Firm* — Sheppard Mullin Richter & Hampton LLP

(57) ABSTRACT

A system and method for enhancing biometric security utilizing a fingerprint sequence authentication process. The method comprising, during an enrollment period for an electronic transaction system, obtaining a set of fingerprint templates associated with a registering user; storing the fingerprint templates on a memory of the electronic transaction system; determining an verification sequence unique to the registering user, wherein the verification sequence comprises a pattern of entering fingerprint images; and associating the verification sequence with the stored set of fingerprint templates to be used for a subsequent authentication of the registering user.

19 Claims, 8 Drawing Sheets

(56) References Cited

U.S. PATENT DOCUMENTS

| | | |
|---|---|---|
| 4,993,068 A | 2/1991 | Piosenka et al. |
| 5,175,416 A | 12/1992 | Mansvelt et al. |
| 5,180,901 A | 1/1993 | Hiramatsu |
| 5,180,902 A | 1/1993 | Schick et al. |
| 5,193,114 A | 3/1993 | Moseley et al. |
| 5,245,329 A | 9/1993 | Gokcebay |
| 5,259,649 A | 11/1993 | Shomron |
| 5,321,751 A | 6/1994 | Ray et al. |
| 5,438,184 A | 8/1995 | Roberts et al. |
| 5,461,217 A | 10/1995 | Claus et al. |
| 5,513,272 A | 4/1996 | Bogosian et al. |
| 5,521,363 A | 5/1996 | Tannenbaum |
| 5,521,966 A | 5/1996 | Friedes et al. |
| 5,534,857 A | 7/1996 | Laing et al. |
| 5,539,825 A | 7/1996 | Akiyama et al. |
| 5,541,985 A | 7/1996 | Ishii |
| 5,559,504 A | 9/1996 | Itsumi et al. |
| 5,559,887 A | 9/1996 | Davis et al. |
| 5,577,121 A | 11/1996 | Davis et al. |
| 5,578,808 A | 11/1996 | Taylor et al. |
| 5,581,630 A | 12/1996 | Bonneau et al. |
| 5,590,038 A | 12/1996 | Pitroda |
| 5,590,197 A | 12/1996 | Chen et al. |
| 5,602,918 A | 2/1997 | Chen et al. |
| 5,604,801 A | 2/1997 | Dolan et al. |
| 5,613,001 A | 3/1997 | Bakhoum |
| 5,677,953 A | 10/1997 | Dolphin |
| 5,703,753 A | 12/1997 | Mok |
| 5,721,781 A | 2/1998 | Deo et al. |
| 5,737,439 A | 4/1998 | Lapsley et al. |
| 5,739,512 A | 4/1998 | Tognazzini |
| 5,742,756 A | 4/1998 | Dillaway et al. |
| 5,742,845 A | 4/1998 | Wagner |
| 5,757,917 A | 5/1998 | Rose et al. |
| 5,764,789 A | 6/1998 | Pare, Jr. et al. |
| 5,778,173 A | 7/1998 | Apte et al. |
| 5,796,831 A | 8/1998 | Paradinas et al. |
| 5,799,087 A | 8/1998 | Rosen |
| 5,806,045 A | 9/1998 | Biorge et al. |
| 5,815,252 A | 9/1998 | Price et al. |
| 5,815,657 A | 9/1998 | Williams et al. |
| 5,826,241 A | 10/1998 | Stein et al. |
| 5,826,243 A | 10/1998 | Musmanno et al. |
| 5,835,894 A | 11/1998 | Adcock et al. |
| 5,838,818 A | 11/1998 | Herley et al. |
| 5,857,079 A | 1/1999 | Claus et al. |
| 5,869,822 A | 2/1999 | Meadows et al. |
| 5,875,432 A | 2/1999 | Sehr |
| 5,884,271 A | 3/1999 | Pitroda |
| 5,884,292 A | 3/1999 | Baker et al. |
| 5,889,941 A | 3/1999 | Tushie |
| 5,892,211 A | 4/1999 | Davis et al. |
| 5,898,838 A | 4/1999 | Wagner |
| 5,901,239 A | 5/1999 | Kamei |
| 5,905,908 A | 5/1999 | Wagner |
| 5,907,620 A | 5/1999 | Klemba et al. |
| 5,912,446 A | 6/1999 | Wong et al. |
| 5,915,973 A | 6/1999 | Hoehn et al. |
| 5,917,913 A | 6/1999 | Wang et al. |
| 5,917,925 A | 6/1999 | Moore et al. |
| 5,920,058 A | 7/1999 | Weber et al. |
| 5,920,629 A | 7/1999 | Rosen |
| 5,920,847 A | 7/1999 | Kolling et al. |
| 5,930,767 A | 7/1999 | Reber et al. |
| 5,931,917 A | 8/1999 | Nguyen et al. |
| 5,936,226 A | 8/1999 | Aucsmith |
| 5,942,761 A | 8/1999 | Tuli |
| 5,978,495 A * | 11/1999 | Thomopoulos .... G06K 9/00013 382/116 |
| 5,987,155 A | 11/1999 | Dunn et al. |
| 5,988,497 A | 11/1999 | Wallace et al. |
| 5,991,411 A | 11/1999 | Kaufman et al. |
| 5,995,014 A | 11/1999 | DiMaria |
| 6,012,039 A | 1/2000 | Hoffman et al. |
| 6,012,636 A | 1/2000 | Smith et al. |
| 6,016,476 A | 1/2000 | Maes et al. |
| 6,018,739 A | 1/2000 | McCoy et al. |
| 6,041,410 A | 3/2000 | Shi et al. |
| 6,045,956 A | 4/2000 | Kato |
| 6,047,281 A | 4/2000 | Wilson et al. |
| 6,047,282 A | 4/2000 | Wilson et al. |
| 6,060,815 A | 5/2000 | Nysen |
| 6,070,159 A | 5/2000 | Wilson et al. |
| 6,091,835 A | 7/2000 | Smithies et al. |
| 6,095,413 A | 8/2000 | Tetro et al. |
| 6,095,519 A | 8/2000 | Shoemaker, Jr. |
| 6,101,477 A | 8/2000 | Hohle et al. |
| 6,104,311 A | 8/2000 | Lastinger |
| 6,104,922 A | 8/2000 | Baumann et al. |
| 6,116,736 A | 9/2000 | Stark et al. |
| 6,120,461 A | 9/2000 | Smyth |
| 6,130,623 A | 10/2000 | MacLellan et al. |
| 6,148,093 A | 11/2000 | McConnell et al. |
| 6,154,879 A | 11/2000 | Pare, Jr. et al. |
| 6,175,656 B1 | 1/2001 | Hoang |
| 6,182,892 B1 | 2/2001 | Angelo et al. |
| 6,199,079 B1 | 3/2001 | Gupta et al. |
| 6,199,762 B1 | 3/2001 | Hohle |
| 6,219,639 B1 | 4/2001 | Bakis et al. |
| 6,223,984 B1 | 5/2001 | Renner et al. |
| 6,233,348 B1 | 5/2001 | Fujii et al. |
| 6,256,690 B1 | 7/2001 | Carper |
| 6,257,486 B1 | 7/2001 | Teicher et al. |
| 6,257,620 B1 | 7/2001 | Kenney |
| 6,263,446 B1 | 7/2001 | Kausik et al. |
| 6,265,977 B1 | 7/2001 | Vega et al. |
| 6,268,788 B1 | 7/2001 | Gray |
| 6,269,348 B1 | 7/2001 | Pare, Jr. et al. |
| 6,270,011 B1 | 8/2001 | Gottfried |
| 6,272,562 B1 | 8/2001 | Scott et al. |
| 6,275,353 B1 | 8/2001 | Briggs |
| 6,282,649 B1 | 8/2001 | Lambert |
| 6,298,146 B1 | 10/2001 | Ilan et al. |
| 6,307,956 B1 | 10/2001 | Black |
| 6,325,285 B1 | 12/2001 | Baratelli |
| 6,327,578 B1 | 12/2001 | Linehan |
| 6,332,193 B1 | 12/2001 | Glass et al. |
| 6,338,048 B1 | 1/2002 | Mori |
| 6,338,435 B1 | 1/2002 | Carper |
| 6,345,761 B1 | 2/2002 | Seelbach et al. |
| 6,357,663 B1 | 3/2002 | Takahashi et al. |
| 6,360,953 B1 | 3/2002 | Lin et al. |
| 6,390,374 B1 | 5/2002 | Carper et al. |
| 6,424,249 B1 | 7/2002 | Houvener |
| 6,442,286 B1 | 8/2002 | Kramer |
| 6,446,862 B1 | 9/2002 | Mann |
| 6,480,825 B1 | 11/2002 | Sharma et al. |
| 6,480,935 B1 | 11/2002 | Carper et al. |
| 6,483,929 B1 | 11/2002 | Murakami et al. |
| 6,483,932 B1 | 11/2002 | Martinez et al. |
| 6,490,443 B1 | 12/2002 | Freeny, Jr. |
| 6,496,594 B1 | 12/2002 | Prokoski |
| 6,507,662 B1 | 1/2003 | Brooks |
| 6,519,565 B1 | 2/2003 | Clements et al. |
| 6,539,101 B1 | 3/2003 | Black |
| 6,560,581 B1 | 5/2003 | Fox et al. |
| 6,588,660 B1 | 7/2003 | Buescher et al. |
| 6,588,673 B1 | 7/2003 | Chan et al. |
| 6,591,249 B2 | 7/2003 | Zoka |
| 6,601,759 B2 | 8/2003 | Fife et al. |
| 6,601,762 B2 | 8/2003 | Piotrowski |
| 6,609,656 B1 | 8/2003 | Elledge |
| 6,615,191 B1 | 9/2003 | Seeley |
| 6,628,813 B2 | 9/2003 | Scott et al. |
| 6,629,591 B1 | 10/2003 | Griswold et al. |
| 6,631,201 B1 | 10/2003 | Dickinson et al. |
| 6,636,620 B1 | 10/2003 | Hoshino |
| 6,655,585 B2 | 12/2003 | Shinn |
| 6,657,614 B1 | 12/2003 | Ito et al. |
| 6,658,164 B1 | 12/2003 | Irving et al. |
| 6,662,166 B2 | 12/2003 | Pare, Jr. et al. |
| 6,669,086 B2 | 12/2003 | Abdi et al. |
| 6,681,328 B1 | 1/2004 | Harris et al. |
| 6,687,391 B1 | 2/2004 | Scott et al. |

(56) References Cited

U.S. PATENT DOCUMENTS

| | | |
|---|---|---|
| 6,697,947 B1 | 2/2004 | Matyas, Jr. et al. |
| 6,703,918 B1 | 3/2004 | Kita |
| 6,719,200 B1 | 4/2004 | Wiebe |
| 6,732,919 B2 | 5/2004 | Macklin et al. |
| 6,734,887 B2 | 5/2004 | Field |
| 6,744,909 B1 | 6/2004 | Kostrzewski et al. |
| 6,744,910 B1 | 6/2004 | McClurg et al. |
| 6,765,470 B2 | 7/2004 | Shinzaki |
| 6,776,332 B2 | 8/2004 | Allen et al. |
| 6,799,726 B2 | 10/2004 | Stockhammer |
| 6,816,058 B2 | 11/2004 | McGregor et al. |
| 6,819,219 B1 | 11/2004 | Bolle et al. |
| 6,826,000 B2 | 11/2004 | Lee et al. |
| 6,828,299 B2 | 12/2004 | Yang et al. |
| 6,828,960 B2 | 12/2004 | Parry |
| 6,834,795 B1 | 12/2004 | Rasmussen et al. |
| 6,867,850 B2 | 3/2005 | McClurg |
| 6,870,946 B1 | 3/2005 | Teng |
| 6,873,974 B1 | 3/2005 | Schutzer |
| 6,877,097 B2 | 4/2005 | Hamid et al. |
| 6,886,104 B1 | 4/2005 | McClurg et al. |
| 6,892,940 B2 | 5/2005 | Kocarev et al. |
| 6,901,154 B2 | 5/2005 | Dunn |
| 6,914,517 B2 | 7/2005 | Kinsella |
| 6,917,695 B2 | 7/2005 | Teng et al. |
| 6,925,439 B1 | 8/2005 | Pitroda |
| 6,925,565 B2 | 8/2005 | Black |
| 6,928,181 B2 | 8/2005 | Brooks |
| 6,928,195 B2 | 8/2005 | Scott et al. |
| 6,929,413 B2 | 8/2005 | Schofield |
| 6,931,538 B1 | 8/2005 | Sawaguchi |
| 6,934,861 B2 | 8/2005 | Haala |
| 6,944,768 B2 | 9/2005 | Siegel et al. |
| 6,954,260 B2 | 10/2005 | Arnold et al. |
| 6,968,453 B2 | 11/2005 | Doyle et al. |
| 6,970,582 B2 | 11/2005 | Langley |
| 6,971,031 B2 | 11/2005 | Haala |
| 6,983,062 B2 | 1/2006 | Smith |
| 6,988,665 B2 | 1/2006 | Schofield |
| 6,996,259 B2 | 2/2006 | Cannon et al. |
| 6,997,381 B2 | 2/2006 | Arnouse |
| 7,010,148 B2 | 3/2006 | Irving et al. |
| 7,028,893 B2 | 4/2006 | Goodman et al. |
| 7,049,962 B2 | 5/2006 | Atherton et al. |
| 7,051,925 B2 | 5/2006 | Schwarz, Jr. |
| 7,059,159 B2 | 6/2006 | Lanigan et al. |
| 7,059,531 B2 | 6/2006 | Beenau et al. |
| 7,068,822 B2 | 6/2006 | Scott |
| 7,073,711 B2 | 7/2006 | Fernandez et al. |
| 7,079,007 B2 | 7/2006 | Siegel et al. |
| 7,095,880 B2 | 8/2006 | Martinez et al. |
| 7,102,523 B2 | 9/2006 | Shanks et al. |
| 7,103,201 B2 | 9/2006 | Scott et al. |
| 7,127,088 B1 | 10/2006 | Grajewski et al. |
| 7,132,946 B2 | 11/2006 | Waldner et al. |
| 7,155,039 B1 | 12/2006 | Lo |
| 7,162,060 B1 | 1/2007 | Barton et al. |
| 7,164,440 B2 | 1/2007 | Cannon |
| 7,165,716 B1 | 1/2007 | Mödl et al. |
| 7,171,662 B1 | 1/2007 | Misra et al. |
| 7,181,017 B1 | 2/2007 | Nagel et al. |
| 7,203,344 B2 | 4/2007 | McClurg et al. |
| 7,218,202 B2 | 5/2007 | Bacchiaz et al. |
| 7,239,227 B1 | 7/2007 | Gupta et al. |
| 7,266,848 B2 | 9/2007 | Moyer et al. |
| 7,271,881 B2 | 9/2007 | Arnold et al. |
| 7,278,025 B2 | 10/2007 | Saito et al. |
| 7,289,649 B1 | 10/2007 | Walley et al. |
| 7,303,120 B2 | 12/2007 | Beenau et al. |
| 7,305,563 B2 | 12/2007 | Bacchiaz et al. |
| 7,308,122 B2 | 12/2007 | McClurg et al. |
| 7,314,164 B2 | 1/2008 | Bonalle et al. |
| 7,314,165 B2 | 1/2008 | Bonalle et al. |
| 7,319,565 B2 | 1/2008 | Arnold et al. |
| 7,325,724 B2 | 2/2008 | Bonalle et al. |
| 7,364,071 B2 | 4/2008 | Esplin |
| 7,466,348 B2 | 12/2008 | Morikawa et al. |
| 7,506,172 B2 | 3/2009 | Bhakta |
| 7,543,337 B2 | 6/2009 | D'Agnolo |
| 7,724,137 B2 | 5/2010 | Page |
| 7,730,526 B2 | 6/2010 | Lamplough |
| 7,751,593 B2 | 7/2010 | Hombo |
| 7,938,329 B2 | 5/2011 | Tran |
| 7,946,501 B2 | 5/2011 | Borracci |
| 7,992,789 B2 | 8/2011 | Borracci |
| 8,045,956 B2 | 10/2011 | Sun |
| 8,095,519 B2 | 1/2012 | Delia |
| 8,186,580 B2 | 5/2012 | Cannon et al. |
| 8,253,531 B2 | 8/2012 | Davis et al. |
| 8,275,353 B2 | 9/2012 | Sun |
| 8,276,816 B2 | 10/2012 | Gardner |
| 8,307,207 B2 | 11/2012 | Bacchiaz et al. |
| 8,360,322 B2 | 1/2013 | Bonalle et al. |
| 8,485,442 B2 | 7/2013 | McNeal |
| 8,490,872 B2 | 7/2013 | Kim |
| 8,499,164 B2 | 7/2013 | Ortiz et al. |
| 8,553,251 B2 | 10/2013 | Iizuka |
| 8,572,395 B2 | 10/2013 | Ito |
| 8,598,981 B2 | 12/2013 | Idsøe et al. |
| 8,607,063 B2 | 12/2013 | Ikeuchi |
| 8,708,230 B2 | 4/2014 | Cannon et al. |
| 8,713,660 B2 | 4/2014 | Carper |
| 8,756,680 B2 | 6/2014 | Shashidhar |
| 8,782,427 B2 | 7/2014 | Fedronic et al. |
| 8,783,578 B2 | 7/2014 | Kim |
| 8,786,033 B2 | 7/2014 | Saito |
| 8,799,167 B2 | 8/2014 | Carper |
| 9,697,388 B1 | 7/2017 | Jacobson |
| 2001/0049785 A1 | 12/2001 | Kawan |
| 2002/0059523 A1 | 5/2002 | Bacchiaz et al. |
| 2002/0095587 A1 | 7/2002 | Doyle et al. |
| 2002/0153424 A1 | 10/2002 | Li |
| 2003/0046554 A1 | 3/2003 | Leydier |
| 2003/0159044 A1 | 8/2003 | Doyle |
| 2004/0039909 A1 | 2/2004 | Cheng |
| 2004/0129787 A1 | 7/2004 | Saito et al. |
| 2004/0188519 A1 | 9/2004 | Cassone |
| 2004/0266267 A1 | 12/2004 | Inaba |
| 2005/0035200 A1 | 2/2005 | Hendrick |
| 2005/0125674 A1 | 6/2005 | Nishiki |
| 2005/0139685 A1 | 6/2005 | Kozlay |
| 2005/0144354 A1 | 6/2005 | Murashita |
| 2005/0182947 A1 | 8/2005 | Bacchiaz et al. |
| 2005/0240778 A1 | 10/2005 | Saito |
| 2006/0032905 A1 | 2/2006 | Bear |
| 2006/0070114 A1 | 3/2006 | Wood |
| 2006/0113381 A1 | 6/2006 | Hochstein et al. |
| 2006/0161789 A1 | 7/2006 | Doughty |
| 2006/0208066 A1 | 9/2006 | Finn |
| 2007/0033150 A1* | 2/2007 | Nwosu .......... G06Q 20/12 705/76 |
| 2007/0040017 A1 | 2/2007 | Kozlay |
| 2007/0043594 A1 | 2/2007 | Lavergne |
| 2007/0073619 A1 | 3/2007 | Smith |
| 2007/0124536 A1 | 5/2007 | Carper |
| 2007/0154018 A1 | 7/2007 | Watanabe |
| 2007/0186106 A1 | 8/2007 | Ting |
| 2007/0194131 A1 | 8/2007 | Brown |
| 2007/0220273 A1 | 9/2007 | Campisi |
| 2007/0228154 A1 | 10/2007 | Tran |
| 2007/0251997 A1 | 11/2007 | Brown |
| 2008/0005425 A1 | 1/2008 | Saito |
| 2008/0016370 A1 | 1/2008 | Libin |
| 2008/0019578 A1 | 1/2008 | Saito et al. |
| 2008/0040615 A1 | 2/2008 | Carper et al. |
| 2008/0054875 A1 | 3/2008 | Saito |
| 2008/0072065 A1 | 3/2008 | Bonalle et al. |
| 2008/0097924 A1 | 4/2008 | Carper et al. |
| 2008/0126260 A1 | 5/2008 | Cox |
| 2008/0164325 A1 | 7/2008 | Borracci |
| 2008/0201658 A1 | 8/2008 | Saito et al. |
| 2008/0223921 A1 | 9/2008 | Salazar et al. |
| 2008/0223925 A1 | 9/2008 | Saito et al. |
| 2008/0230613 A1 | 9/2008 | Leibenguth |

(56) References Cited

U.S. PATENT DOCUMENTS

| | | | |
|---|---|---|---|
| 2009/0084858 A1 | 4/2009 | Borracci | |
| 2009/0094125 A1 | 4/2009 | Killian | |
| 2009/0313493 A1 | 12/2009 | Ide | |
| 2009/0322477 A1 | 12/2009 | Celorio | |
| 2010/0039234 A1 | 2/2010 | Soliven et al. | |
| 2010/0080425 A1* | 4/2010 | Bebis | G06K 9/00073 |
| | | | 382/125 |
| 2010/0148312 A1 | 6/2010 | Jung | |
| 2010/0153451 A1 | 6/2010 | Delia et al. | |
| 2010/0215224 A1 | 8/2010 | Saito | |
| 2010/0257359 A1 | 10/2010 | Currie | |
| 2010/0260388 A1 | 10/2010 | Garrett | |
| 2010/0275259 A1 | 10/2010 | Adams | |
| 2011/0238540 A1 | 9/2011 | Carrington | |
| 2011/0256832 A1 | 10/2011 | Park | |
| 2012/0016798 A1 | 1/2012 | Carper | |
| 2012/0022957 A1 | 1/2012 | Sun | |
| 2012/0079273 A1 | 3/2012 | Bacchiaz et al. | |
| 2012/0218079 A1 | 8/2012 | Kim | |
| 2012/0241524 A1 | 9/2012 | Blot et al. | |
| 2012/0297467 A1 | 11/2012 | Carper | |
| 2012/0313754 A1 | 12/2012 | Bona | |
| 2013/0026230 A1 | 1/2013 | Cannon et al. | |
| 2013/0036463 A1 | 2/2013 | Shashidhar | |
| 2013/0056540 A1 | 3/2013 | Blot et al. | |
| 2013/0080788 A1 | 3/2013 | Bacchiaz et al. | |
| 2013/0290136 A1 | 10/2013 | Sheets | |
| 2014/0006277 A1 | 1/2014 | Rao | |
| 2014/0046785 A1 | 2/2014 | Jenkins | |
| 2014/0232526 A1 | 8/2014 | Carper | |
| 2014/0251997 A1 | 9/2014 | Bitton | |
| 2015/0067348 A1* | 3/2015 | Webber | G06F 21/32 |
| | | | 713/186 |
| 2015/0127553 A1 | 5/2015 | Sundaram | |
| 2015/0262170 A1 | 9/2015 | Bouda | |
| 2015/0379033 A1 | 12/2015 | Agarwal | |
| 2016/0191512 A1 | 6/2016 | Tatourian | |
| 2017/0170513 A1 | 6/2017 | Sakamoto | |

FOREIGN PATENT DOCUMENTS

| | | |
|---|---|---|
| AU | 2003274967 A1 | 4/2004 |
| AU | 2004218720 B2 | 11/2004 |
| AU | 784438 B2 | 4/2006 |
| AU | 2006311596 A1 | 5/2007 |
| AU | 2007229728 A1 | 10/2007 |
| AU | 2010224455 A1 | 1/2011 |
| CA | 2346592 A1 | 11/2001 |
| CA | 2498288 A1 | 3/2004 |
| CA | 2564707 A1 | 11/2005 |
| CA | 2629435 A1 | 5/2007 |
| CA | 2748563 A1 | 3/2012 |
| CA | 2844003 A1 | 2/2013 |
| DE | 60111892 T2 | 8/2005 |
| DE | 10393215 T5 | 9/2005 |
| EP | 994439 A2 | 4/2000 |
| EP | 1256908 A1 | 11/2002 |
| EP | 1418486 A3 | 12/2004 |
| EP | 1537526 | 6/2005 |
| EP | 1157906 A2 | 7/2005 |
| EP | 1647942 A2 | 4/2006 |
| EP | 1716660 | 11/2006 |
| EP | 1759337 | 3/2007 |
| EP | 1924976 | 5/2008 |
| EP | 1952244 | 8/2008 |
| EP | 2290625 A1 | 3/2011 |
| EP | 2434462 A1 | 3/2012 |
| EP | 2569735 B1 | 3/2013 |
| FR | 2953619 A1 | 6/2011 |
| FR | 2959847 A1 | 11/2011 |
| GB | 2473283 A | 3/2011 |
| JP | 02088859 | 3/1990 |
| JP | 02118790 A | 5/1990 |
| JP | 11039483 A | 2/1999 |
| JP | 2001250064 A | 9/2001 |
| JP | 2001323691 A | 11/2001 |
| JP | 2002183706 A | 6/2002 |
| JP | 2005242650 A | 9/2005 |
| JP | 2005326995 A | 11/2005 |
| JP | 2006257871 A | 9/2006 |
| JP | 200748118 | 2/2007 |
| JP | 2007156785 A | 6/2007 |
| JP | 2007058649 A | 8/2007 |
| JP | 2007265321 | 10/2007 |
| JP | 2008078820 A | 4/2008 |
| JP | 2011090686 A | 5/2011 |
| JP | 2012074011 A | 4/2012 |
| JP | 2010262586 A | 6/2012 |
| JP | 2014134845 | 7/2014 |
| WO | 9718653 | 5/1997 |
| WO | 2001016707 | 3/2001 |
| WO | 2001016707 al | 3/2001 |
| WO | 2001016759 | 3/2001 |
| WO | 2001016759 A1 | 3/2001 |
| WO | 2001016865 | 3/2001 |
| WO | 2001016865 A1 | 3/2001 |
| WO | 2001016873 | 3/2001 |
| WO | 2001016873 A1 | 3/2001 |
| WO | 2001016874 A1 | 3/2001 |
| WO | 2001039427 A1 | 3/2001 |
| WO | 2004025545 A2 | 3/2004 |
| WO | 2005104704 A1 | 11/2005 |
| WO | 2006102625 A2 | 9/2006 |
| WO | 2007022423 A2 | 2/2007 |
| WO | 2007056476 A2 | 5/2007 |
| WO | 2007064429 A1 | 6/2007 |
| WO | 2007143670 A2 | 12/2007 |
| WO | 2007146681 A2 | 12/2007 |
| WO | 2008010899 A2 | 1/2008 |
| WO | 2008079491 A2 | 7/2008 |
| WO | 2010019961 A2 | 2/2010 |
| WO | 2010077999 A2 | 7/2010 |
| WO | 2010133469 A1 | 11/2010 |
| WO | 2010133496 | 11/2010 |
| WO | 2011067543 A1 | 6/2011 |
| WO | 2011141659 A2 | 11/2011 |

OTHER PUBLICATIONS

Patent Cooperation Treaty, International Search Report for PCT/US2016/000026, dated May 6, 2016, pp. 4-5.

Noore, Afzel, "Highly Robust Biometric Smart Card Design," IEEE Transactions on Consumer Electronics, Nov. 2, 2000, pp. 1059-1063, vol. 46, No. 4.

Kim, Dong-Sun, "On the Design of an Embedded Biometric Smart Card Reader," IEEE, Apr. 16, 2008, pp. 573-577.

Kim, Seong-Jin, "A CMOS Fingerprint System-on-a-Chip With Adaptable Pixel Networks and Column-Parallel Processors for Image Enhancement and Recognition," IEEE Journal of Solid-State Circuits, Nov. 2008, pp. 2558-2567, vol. 43, No. 11.

Nixon, Jenny, "Reconciling your Quicken Account with the Bank Statement," University of Nebraska, Lincoln, 2005.

"Biometric Technology for Secure Access," Sep. 18, 2007, Biometric Associates, Inc., Baltimore, MD, USA.

Jung, Stefan, "A Low-Power and High-Performance CMOS Fingerprint Sensing and Encoding Architecture," IEEE Journal of Solid-State Circuits, Jul. 1999, pp. 978-984, vol. 34, No. 7.

Noore, Afzel, "Highly Robust Biometric Smart Card Design," IEEE Transactions on Consumer Electronics, Nov. 2000, pp. 1059-1063, vol. 46, No. 4.

Sanchez-Reillo, Raul, et al., "Fingerprint Verification Using Smart Cards for Access Control Systems," 2001, pp. 250-253.

Sanchez-Reillo, Raul, et al., "Microprocessor Smart Cards with Fingerprint User Authorization," IEEE AESS Systems Magazine, Mar. 2003, pp. 22-24.

Sung, Bum Pan, et al., "An Ultra-Low Memory Fingerprint Matching Algorithm and Its Implementation on a 32-bit Smart Card," IEEE, Mar. 26, 2003, pp. 453-459.

ISO 7816 Part 3: Electronic Signals and Transmission Protocols, www.cardwerk.com/smartcards/smartcard_standard_IS07816-3.aspx, Jan. 12, 2015 (11 pages).

(56) References Cited

OTHER PUBLICATIONS

John Fenske, "Biometrics Move to Smart Cards and Smartphones for Access Control", John Fenske, Jul. 30, 2013 (4 pages).
Patent Cooperation Treaty, International Search Report for PCT/IB2016/000324, dated Oct. 18, 2016, pp. 4-5.
Patent Cooperation Treaty, International Preliminary Report on Patentability PCT/IB2016/000020, dated Jul. 18, 2017, p. 4.
Patent Cooperation Treaty, International Preliminary Report on Patentability for PCT/IB2016/000048, dated Apr. 26, 2016, p. 4.
Patent Cooperation Treaty, International Search Report for PCT/IB2016/00093, dated Sep. 5, 2017, p. 7.
Patent Cooperation Treaty, International Preliminary Report on Patentability for PCT/IB2016/000093, dated Sep. 26, 2017, p. 4.
Patent Cooperation Treaty, International Preliminary Report on Patentability for PCT/IB2016/000026, dated Jul. 18, 2017, p. 4.
Patent Cooperation Treaty, International Preliminary Report on Patentability for PCT/IB2016/000324, dated Sep. 26, 2017, p. 4.
Patent Cooperation Treaty, International Preliminary Report on Patentability for PCT/IB2016/000048, dated Jul. 25, 2017, p. 4.
Patent Cooperation Treaty, International Search Report for PCT/IB2016/00020, dated May 24, 2017, pp. 2-3.
Patent Cooperation Treaty, International Search Report for PCT/US2016/000048, dated Apr. 26, 2016, p. 5.

* cited by examiner

BIOMETRIC DEVICE UTILIZING FINGER SEQUENCE FOR AUTHENTICATION

CROSS-REFERENCE TO RELATED APPLICATIONS

The present application is related to co-pending U.S. patent application Ser. No. 14/596,508, filed Jan. 14, 2015, entitled "System and Method for Requesting Reconciliation of Electronic Transaction Records for Enhanced Security"; U.S. patent application Ser. No. 14/596,472, filed Jan. 14, 2015, entitled "System and Method for Comparing Electronic Transaction Records for Enhanced Security"; U.S. patent application Ser. No. 14/596,420, filed Jan. 14, 2015, entitled "System and Method for Reconciling Electronic Transaction Records for Enhanced Security"; and U.S. patent application Ser. No. 14/596,572, filed Jan. 14, 2015, entitled "Smart Card Systems Comprising a Card and a Carrier," which are all incorporated herein by reference in their entirety.

FIELD OF THE INVENTION

The present disclosure relates generally to biometric security, and more particularly, some embodiments relate to biometric authentication utilizing a fingerprint sequence.

BACKGROUND

Electronic transactions, such as credit card transactions, can be conducted using smart cards. A smart card is a device that includes an embedded integrated circuit chip that can be either a secure processing module (e.g., microprocessor, microcontroller, or equivalent intelligence) operating with an internal or external memory or a memory chip alone. Smart cards can provide identification, authentication, data storage, and application processing, as well as serving as credit or ATM debit cards, phone or fuel cards, and high-security access-control cards for granting access to a building or computer. Smart cards can authenticate the identity of a user by employing a public key infrastructure (PKI). This authentication process may be conducted in a variety of ways, including through the use of a pin, password, or biometric authentication, or a combination of methods for added layers of security.

BRIEF SUMMARY OF THE INVENTION

According to various embodiments of the disclosed technology, a method of enhanced biometric security is provided, comprising, during an enrollment period obtaining a set of fingerprint templates associated with a registering user; storing the fingerprint templates on a memory of the electronic transaction system; determining a verification sequence unique to the registering user, wherein the verification sequence comprises a pattern of entering fingerprint images; and associating the verification sequence with the stored set of fingerprint templates to be used for a subsequent authentication of the registering user.

According to various embodiments of the disclosed technology, a method of authenticating a registered user in an electronic transaction system is provided, comprising obtaining one or more fingerprint templates associated with a party requesting a new transaction, the one or more fingerprint templates associated with the party generated from one or more fingerprint images entered by the party in a first sequence; comparing the one or more fingerprint templates associated with the party to one or more fingerprint templates associated with a registered user and a second sequence, the set of fingerprint templates generated from a set of fingerprint images entered by the registered user during an enrollment process; and determining whether there is a match between the first sequence and the second sequence.

According to various embodiments of the disclosed technology, an electronic transactions system is provided, comprising a fingerprint scanner configured to obtain one or more fingerprint images entered by a party requesting a new transaction in a first sequence; a memory for storing a set of fingerprint templates associated with a registered user and a second sequence, the set of fingerprint templates generated from a plurality of fingerprint images entered by the registered user during an enrollment process; and one or more processing modules communicatively coupled to the memory and the fingerprint scanner, and configured to: generate one or more fingerprint templates associated with the party from the one or more fingerprint images entered by the party via the fingerprint scanner; compare the one or more fingerprint templates associated with the party to one or more fingerprint templates from the set of fingerprint templates associated with the registered user; and determine whether there is a match between the first sequence and the second sequence.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF SEVERAL VIEWS OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Embodiments of the technology disclosed herein are directed toward a system for and method of enhancing the security of a biometric device. More particularly, the various embodiments of the technology disclosed herein relate to biometric security utilizing fingerprint sequence authentication.

In the following detailed description, numerous specific details are set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

Figure 1A:
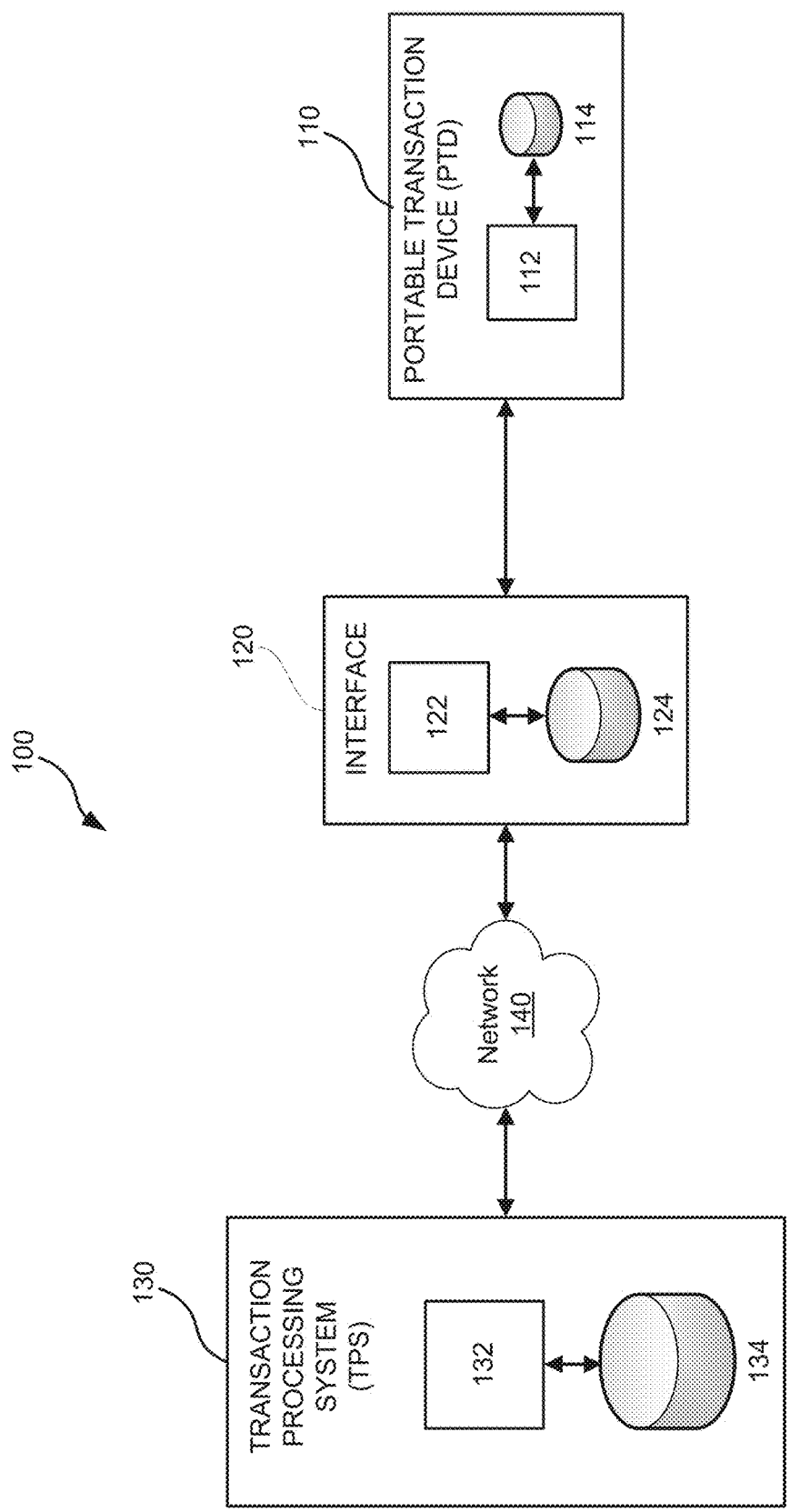
FIGS. 1A & 1B are example environments within which various embodiments of the technology disclosed herein may be implemented.

Before describing the technology disclosed in detail, it is useful to describe an example environment within which the technology can be implemented. FIG. 1A is a block diagram of an example electronic transaction system 100 that can implement a finger sequence authentication procedure according to certain aspects of the present disclosure. The system 100 includes an electronic portable transaction device (PTD) 110, a transaction processing system (TPS) 130, and an interface device 120 that facilitates communications between the PTD 110 and the TPS 130. The PTD 110 can be, for example, a smart card, a smart key, a smart fob, or a mobile device. In some embodiments, the PTD 110 can include a biometric authentication module (not shown) for biometric authentication, as discussed in more detail with regards to FIG. 2.

The PTD 110 can conduct various types of electronic transactions with the TPS 130 via the interface device 120. For financial transaction applications, the PTD 110 can be a smart payment card such as a smart credit, debit, and/or prepaid card, or a smartphone with a payment transaction application. The TPS 130 can be a payment processing system of a merchant (e.g., Target®), a bank (e.g., Bank of America®), or a card issuer (e.g., Visa). The interface device 120 can be a point of sale (POS) terminal that can communicate with the PTD 110 using a contact method (e.g., matching male and female contact pads) or a contactless method (e.g., RFID, Bluetooth, NFC, Wi-Fi, ZigBee).

In some embodiments, the PTD 110 may communicate directly with the TPS 130 without an interface such as the interface device 120. For example, the PTD 110 can be equipped with a transceiver that can communicate with a cellular network such as a 3G UMTS or 4G LTE network. In some embodiments, the PTD 110 can be a smart phone capable of communicating with a cellular network.

For access control applications, the PTD 110 can be a smart access card, smart fob, or smart key for providing access to a facility or computer. For example, a PTD 110 in accordance with the present disclosure may be required to gain access to one or more of a secured facility, specific areas within a facility, a particular computing device or piece of equipment, a computer network, or a combination thereof. The TPS 130 can be a server in a central computer system, or a dedicated access controller that controls access to a facility or computer. Interface device 120 can be a card, fob, or key reader that can communicate with the PTD 110 using a contact method (e.g., contact pads) or a contactless method (e.g., RFID, Bluetooth, NFC, Wi-Fi, ZigBee).

In various embodiments, interface 120 may communicate with TPS 130 over network 140. Network 140 may be any communications network, such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 140 may employ various communication media, such as a coaxial cable, fiber optic cable system, Ethernet, radio waves, etc.

In the illustrated example of FIG. 1A, the PTD 110 includes a processing module 112 and a data storage device 114; the interface device 120 includes a processing module 122 and a data storage device 124; and the TPS 130 includes a processing module 132 and a data storage device 134. In some embodiments, the PTD 110 can include a biometric authentication module (not shown) that includes a biometric sensor and a controller. The processing modules 112, 122, and 132, depending on the application, may be a microprocessor, microcontroller, application-specific integrated circuit (ASIC), field-programmable gate array (FPGA), computer, server, or any combination of components or devices configured to perform and/or control the functions of the PTD 110, interface device 120, and TPS 130, respectively. The data storage devices 114, 124, and 134, depending on the application, may be a read-only memory (ROM), such as EPROM or EEPROM, flash, a hard disk, a database, or any other storage component capable of storing executory programs and information for use by the processing modules 112, 122, and 132, respectively. Although PTD 110, interface device 120, and TPS 130 are all shown including a processing module (112, 122, 132) and a data storage device (114, 124, 134), such components are not required in all embodiments. In various embodiments, only one data storage device or only one processing module may be present that is accessible by one or more of the PTD, the interface device, and the TPS.

Figure 1B:
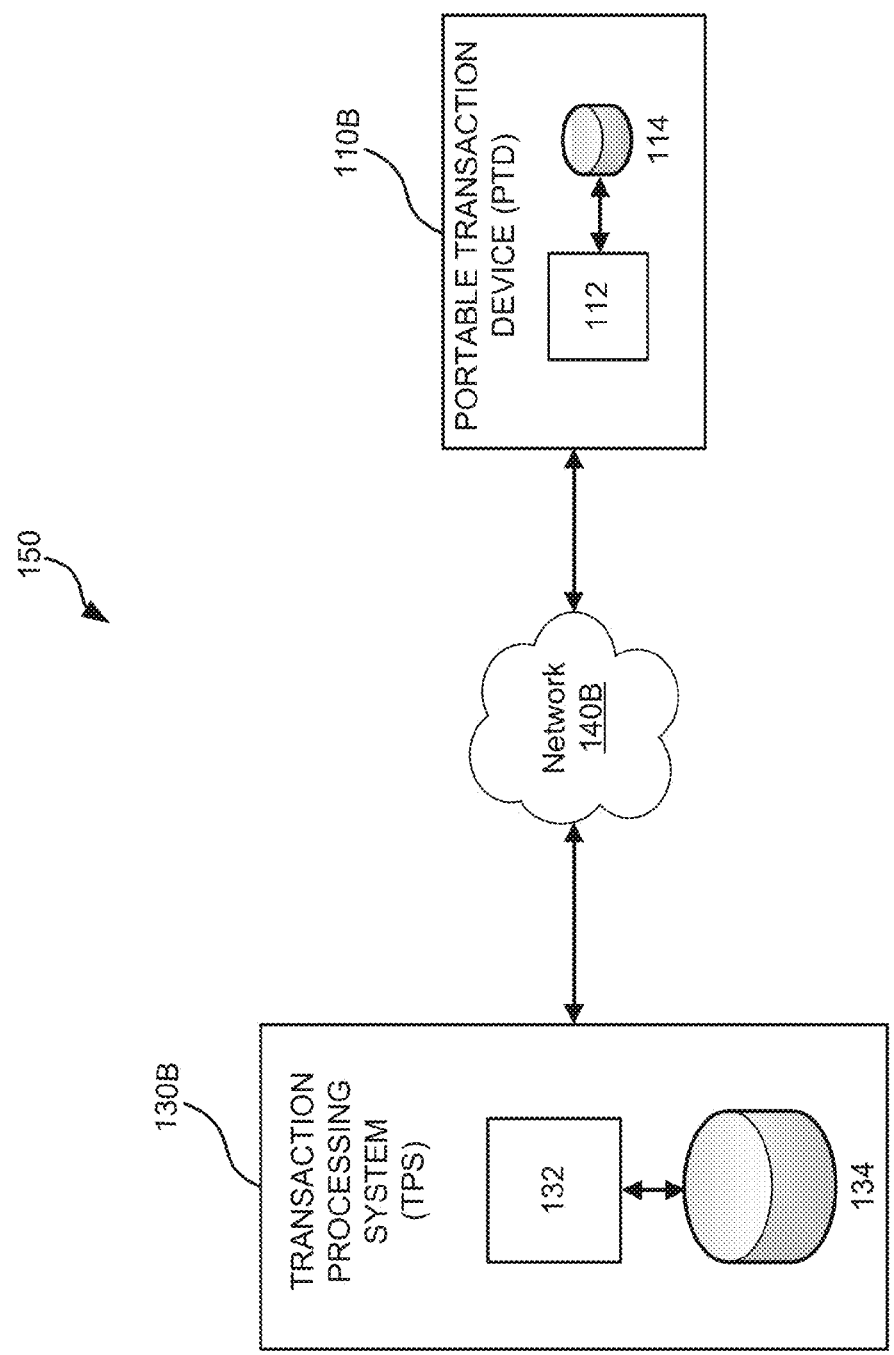

FIG. 1B illustrates another example electronic transaction system 150 that can implement a finger sequence authentication procedure according to certain aspects of the present disclosure. As illustrated in FIG. 1B, electronic transactions occur between a portable transaction device (PTD) 110B and a transaction processing system (TPS) 130B over network 140B, without an interface device. By way of example, a shopper may use a smartphone equipped with a camera to capture an image of a code (e.g., bar or QR code) to make a payment for a product or service by transmitting payment information to a card payment processing system via network 140B, in this case a cellular network. By way of another example, an access card reader at a facility may store information (e.g., passwords and/or security tokens) associated with employees authorized to enter the facility and, upon reading an access card, may compare security information received from the card with the stored information and grant or deny access depending on the outcome of the comparison.

There are many examples of biometric devices with which the present disclosure can be implemented. One example is the biometric smart card illustrated in FIG. 2. In various embodiments, card 200 has substantially the same shape and form factor as conventional credit and debit cards. Card 200 comprises a processing module 212 and a memory 214. Processing module 212 may be a microprocessor, microcontroller, application-specific integrated circuit (ASIC), field-programmable gate array (FPGA), or any combination of components configured to perform and/or control the functions of card 200. Memory 214 may be a read-only memory (ROM) such as EPROM or EEPROM, flash, or any other storage component capable of storing executory programs and information for use by the processing module 212. Memory 214 can be internal to processor 212.

Card 200 includes a transaction interface 216. Transaction interface 216 is communicatively coupled to processing module 212. In various embodiments, transaction interface 216 is configured to communicate with TPS 130 through interface device 120 described above with respect to FIG. 1. Interface device 120 may be any point-of-sale (POS) or other transaction terminal connected to TPS 130 and configured to enable transactions with card 200 to occur.

In various embodiments, transaction interface 216 may include one or more conductive pads or pins that make electrical contact with corresponding conductive pads or pins provided in interface device 120. Data communication between card 200 and interface device 120 occurs through transaction interface 216. In various embodiments, when card 200 is engaged with interface device 120 for a transaction, some of the conductive pads of transaction interface 216 provide paths by which electrical power flows from interface device 120 to the components of card 200 via power line 218. This eliminates the need for card 200 to have its own on-board power source, simplifying design and manufacture.

In other embodiments, card 200 may include additional components to allow direct communication with TPS 130 without the need of interface device 120. Card 200 may include components required to allow contactless communication, such as RFID, Bluetooth, NFC, Wi-Fi, or ZigBee communication with TPS 130.

Figure 2:
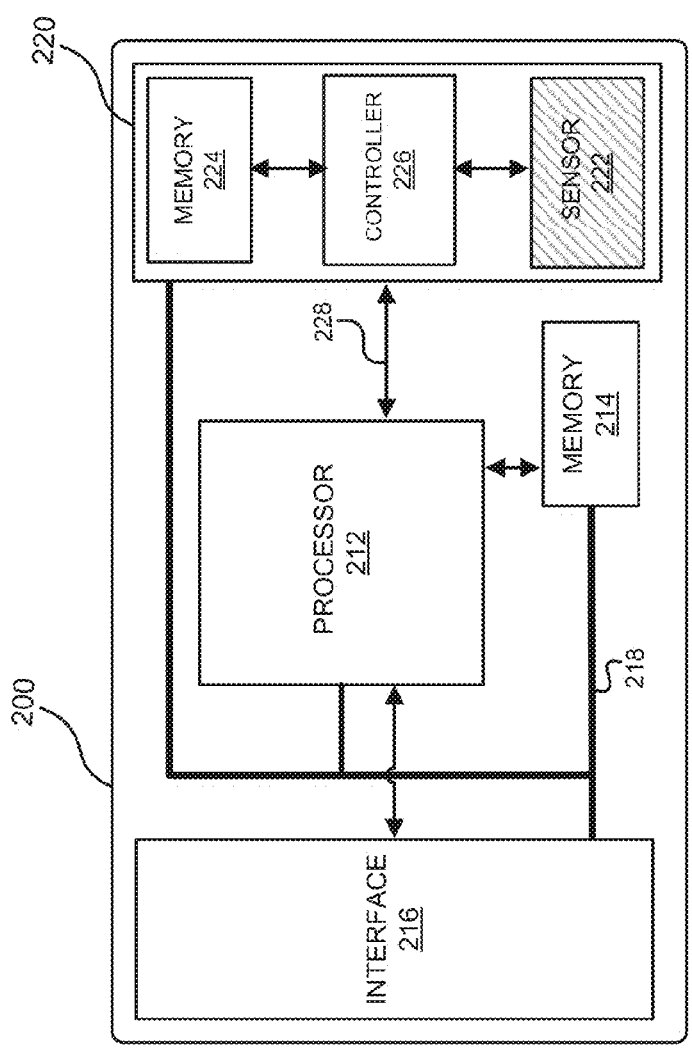
FIG. 2 is an example diagram of a personal transaction device that may be used in accordance with various embodiments of the technology disclosed herein.

As shown in FIG. 2, card 200 further includes a biometric authentication module 220. In various embodiments, biometric authentication module 220 includes an authentication memory 224, a controller module 226, and a biometric sensor 222. Authentication memory 224 may be configured to store a template of the fingerprints of an authorized (e.g., registered) user for authentication purposes. In addition, authentication memory 224 may also be configured to store a copy of an authentication sequence. The authentication process is described in more detail below. Authentication memory 224 may be a read-only memory (ROM) such as EPROM or EEPROM, flash, or any other storage component capable of storing biometric data of one or more authorized users at the time card 200 is issued. In various embodiments, authentication memory 224 may be capable of both read and write commands to allow for the addition of other later authorized users through a reenrollment process after issuance of the card. In various embodiments, authentication memory 224 and memory 214 may be the same component.

Controller 226 is a processing module configured to execute authentication application programming stored in memory 224. In various embodiments, controller 226 may accept a fingerprint image input from sensor 222 and perform additional processing (e.g., extracting, focusing, aligning, rotating, scaling, normalizing and/or formatting) operations on the image to generate a fingerprint template that can be compared to a stored fingerprint template associated with an authorized (e.g., registered) user. In other embodiments, controller 226 can receive an already processed fingerprint template from sensor 222. Controller 226 is coupled to processing module 212 through connection 228. In various embodiments, controller 226 may be a separate hardware processing module from processing module 212. In various embodiments, controller 226 may be implemented in software, such as a virtual machine (VM) executed using processing module 212. In such an embodiment, additional security features may be implemented within processing module 212, such as partitioning between the VM and the card operating system to ensure that no unauthorized access to the controller module occurs. In various embodiments, the authentication application programming executed by controller 226 may be stored in memory 214 and accessible by controller 226 through processing module 212. In various embodiments, controller 226 may have direct access to memory 214.

Biometric sensor 222 is a biometric reader or scanner capable of reading or scanning a user's fingerprints. As discussed above, the biometric input from sensor 222 can be sent directly to controller 226 in order to allow controller 226 to perform formatting operations to generate a fingerprint template. In various embodiments, sensor 222 may be capable of formatting the fingerprint image prior to sending the fingerprint image to controller 226.

Other biometric devices with which the present disclosure may be implemented include smart fobs, smart keys, and mobile devices, among others. For ease of discussion, the authentication process and embodiments thereof are discussed with regards to the biometric-enabled smart card shown in FIG. 2. This discussion should not be read to limit the embodiments to only transactions involving smart cards, as the present disclosure is compatible with any biometric device.

To biometrically authenticate the identity of a person requesting a new transaction involving the biometric smart card 200, a processor in the card 200 can perform a comparison and a matching of one or more fingerprint templates associated with the person (the templates generated from fingerprint images received from biometric sensor 222) to one or more fingerprint templates associated with a registered user stored in a memory (e.g., memory 224 or memory 214). In some embodiments, the controller 226 performs both the generation of fingerprint templates associated with the person and the comparison and matching of the fingerprint templates to the stored fingerprint templates associated with the registered user. In other embodiments, the controller 226 performs the generation of fingerprint templates associated with the person and the processing module 212 performs the comparison and matching of the fingerprint templates to the stored fingerprint templates associated with the registered user.

In various embodiments, card 200 may have only a single component for processing both the transaction and authentication functions of card 200. In various embodiments, this single processing component may be processing module 212, and processing module 212 may be configured to execute both transaction applications and the functions of controller 226 described above. This eliminates the need for multiple processing units on the card and lowers the complexity of the design. In those embodiments employing a single processing component, the single processing component performs the generation of fingerprint templates associated with a person requesting a new transaction and the comparison and matching of the fingerprint templates to stored fingerprint templates associated with a registered user.

Figure 3:
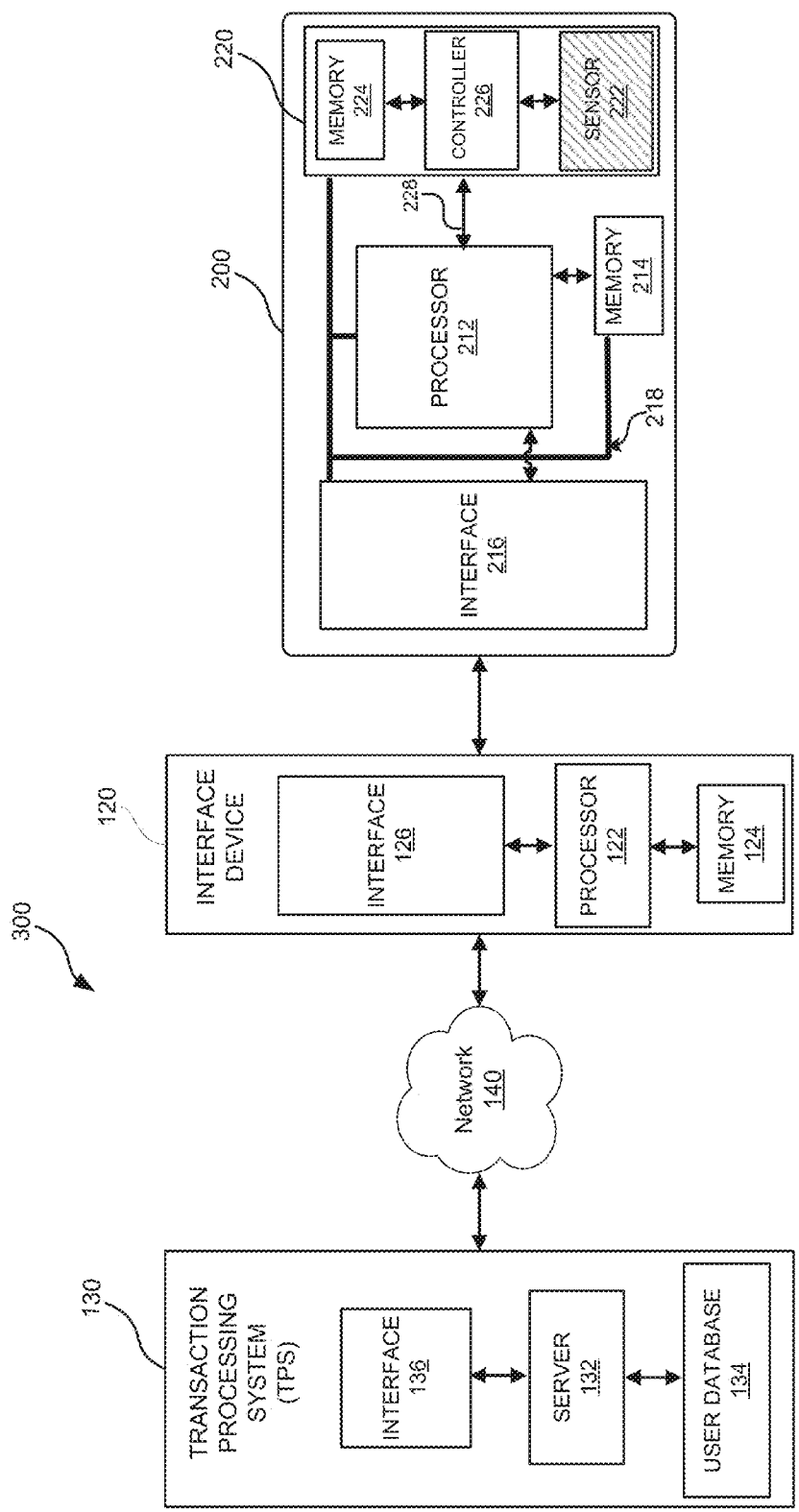
FIG. 3 is an example diagram of a transaction using a personal transaction device in accordance with the technology disclosed herein.

FIG. 3 illustrates an example transaction system 300 implementing card 200. In the illustrated example, the system 300 includes interface device 120 and TPS 130, described above with regards to FIG. 1. Also illustrated is card 200, which corresponds with the PTD 110 of FIG. 1. Although described in terms of card 200, the description should not be read to limit the present disclosure. In other embodiments, other PTDs may be used, such as a mobile device, a smart key, a smart fob, or a combination thereof. As illustrated in FIG. 3, interface device 120 includes a PTD interface 126, a processing module 122, and a data storage device 124. TPS 130 includes a processing module 132, and a data storage device 134, and a network interface 136 for communicating with interface device 120 via a communication network 140.

PTD interface 126 and transaction interface 216 on card 200 provide a communication link between card 200 and interface device 120. Using this communication link, card 200 can communicate authentication- and/or transaction-related data with interface device 120 and/or TPS 130. In various embodiments, interface device 120 may be a terminal and PTD interface 126 may be a physical card reader or scanner. In such embodiments, card 200 interacts with interface device 120 by inserting card 200 into the card reader, or scanning interface 216 of card 200 with the card scanner of interface device 120. In other embodiments, card 200 may include components necessary to enable contactless transactions, such as transceivers required for RFID, Bluetooth, NFC, or ZigBee communication. In various embodiments, interface device 120 supplies power to card 200 through this physical connection. In other embodiments, card 200 may include on on-board power source to supply power to the card components. In still other embodiments, card 200 may include wires or coils configured to receive power through induction principles, such as induction through NFC.

For ease of discussion, card 200 was used in describing transaction system 300. This use, however, should not be read to limit the scope of the present disclosure. Transaction system 300 may be implemented in the same fashion using any PTD 110.

Figure 4:
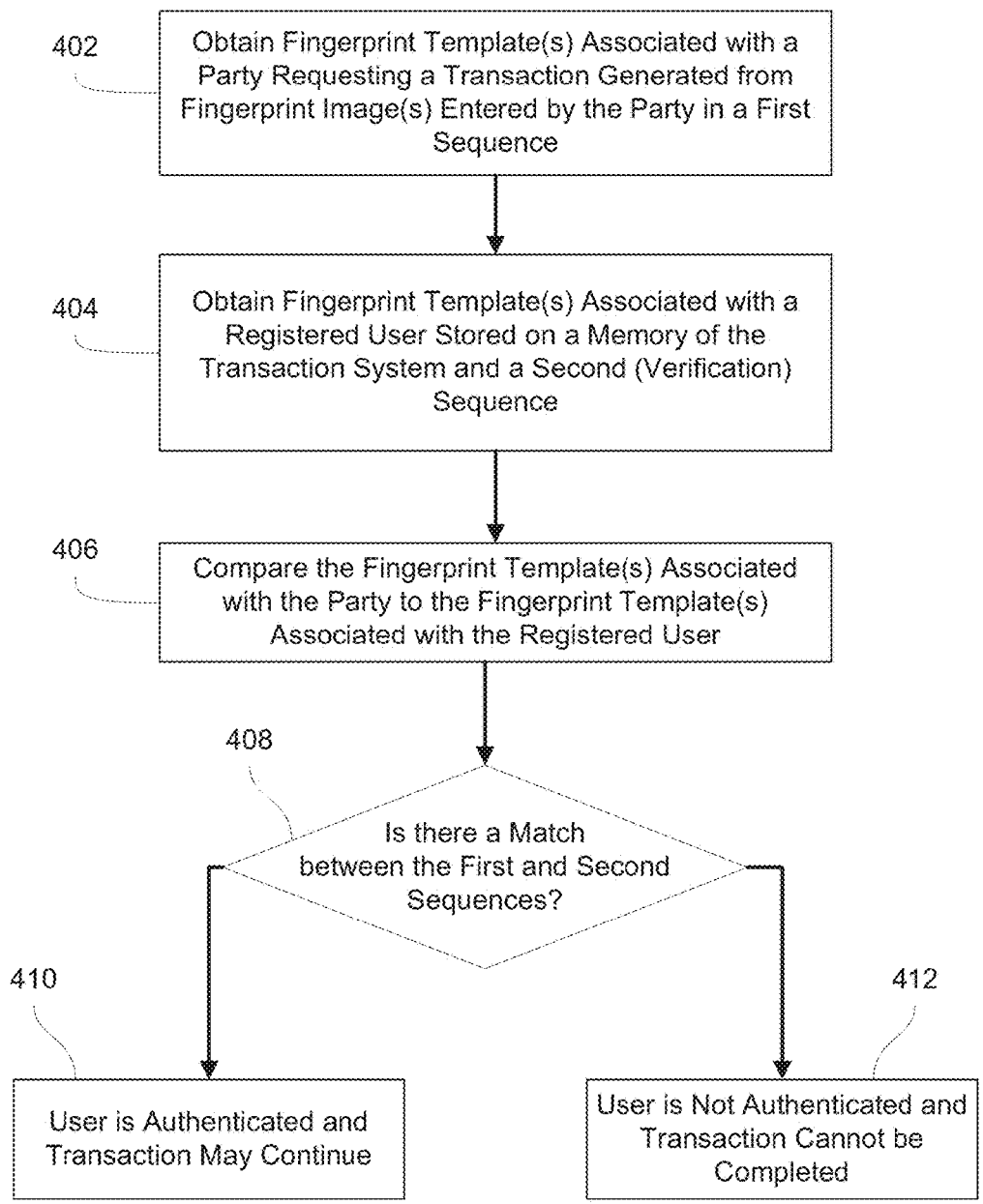
FIG. 4 is an example flowchart of an authentication process in accordance with the technology disclosed herein.

Authenticating the identity of a person attempting to conduct a transaction using a biometric-enabled device, such as card 200, is important. FIG. 4 is a flow diagram of an example authentication process 400 in accordance with the present disclosure. Although discussed in regards to the transaction environment illustrated in FIG. 3, implementation of authentication process 400 should not be limited to the transaction environment of FIG. 3. As one of ordinary skill in the art would recognize, authentication process 400 is applicable in any transaction environment in which fingerprint identification is implemented as a security layer, and with any biometric device. For ease of discussion, authentication process 400 is described in relation to a transaction occurring using a smart card containing a biometric authentication module. Where appropriate, different embodiments may be discussed.

At operation 402, one or more fingerprint templates associated with a party requesting a transaction are obtained. In various embodiments, the one or more fingerprint templates associated with the party are generated by processing (e.g., extracting, focusing, aligning, rotating, scaling, normalizing and/or formatting) fingerprint images entered by the party requesting the new transaction in a first sequence using a fingerprint scanner embedded on a smart card being used to conduct the transaction. In other embodiments, the fingerprint scanner may be part of a transaction terminal, such as interface device 120.

At operation 404, one or more fingerprint templates associated with a registered user authorized to use the smart card are obtained from a memory of the transaction system. In various embodiments, the one or more fingerprint templates associated with the registered user are obtained from a set of fingerprint templates generated from a set of fingerprint images entered by the registered user in a second sequence during an example enrollment process explained below with respect to FIG. 6. In various embodiments, the set of fingerprint templates is stored in authentication memory 224. In other embodiments, the set of fingerprint templates may be stored within data storage devices 134 or 124. In other embodiments, the set of fingerprint templates may be stored in one or more of the different memories discussed above to ensure access to the templates during a transaction.

At operation 406, the one or more fingerprint templates associated with the party requesting the transaction are compared with the one or more fingerprint templates associated with the registered user to authenticate the identity of the party. In various embodiments, the comparison can performed according to their respective sequences, meaning that the one or more fingerprint templates associated with the party in the first sequence are compared with the one or more fingerprint templates associated with the registered party in the second sequence.

At decision 408, a determination is made whether there is a match between the first sequence and the second sequence. In various embodiments, decision 408 may occur during operation 406. The criterion for a match may depend on the algorithm implemented by the operator of the transaction system. For example, the algorithm may involve determining whether a difference between compared fingerprint templates is within a predetermined threshold value (e.g., percentage). In some embodiments, a match/no-match decision is made right after a fingerprint image is received from the party requesting the transaction. In such an embodiment, the party may be rejected after a first fingerprint entry. In other embodiments, the party is allowed to enter the entire sequence of fingerprint images before the decision is made.

If a match is found, the party requesting the transaction is authenticated and the transaction is permitted to continue. In various embodiments, an indication of authentication may be presented to the party via a display on the PTD 110 used, such as smart card 200, or on a display included in the transaction terminal used, such as interface device 120. In other embodiments, a record of successful authentication may be recorded in one or more of authentication memory 224, data storage devices 124 and 134, or a combination thereof. In this way, an authenticated party may be able to conduct several transactions during a session without the need to go through the authentication process each time. In other embodiments, an indication of a successful authentication may be stored in volatile memory only, such as random access memory (RAM). In this way, multiple transactions may be conducted during a single session, but once power is removed the authentication is lost, requiring reauthentication to establish a new transaction session.

If no match is found, the party requesting the transaction is not authenticated and the transaction is not permitted to continue. In various embodiments, an indication of an unauthenticated request may be presented to the party through a display, in a similar fashion as described above with regards to a successful authentication. In other embodiments, an indication of an unauthenticated request may be sent to the TPS 130 to alert the operator that an unauthenticated transaction was attempted. Additional messages to the registered user may be sent, depending on any alert system implemented by the operator of the transaction system.

In various embodiments, the unauthenticated party may be requested to enter a new set of fingerprint images if no match is found. In this way, errors associated with a bad scan by the fingerprint scanner may be accounted for by allowing a second chance to obtain the one or more fingerprint templates, as discussed with regards to operation 402. In various embodiments, the unauthenticated party may only reenter a new set of fingerprint images once before the transaction is terminated and no transaction is permitted. In other embodiments, if no match is found after a predetermined number of tries, the transaction is terminated and the unauthenticated party is locked out of conducting transactions and/or the electronic portable transaction device may be disabled. In such a way, an additional layer of security may be included within the system.

Although discussed in regards to transactions involving a smart card and an interface device, the authentication process of the present disclosure is applicable in other transaction environments. In various embodiments, card 200 may be any of the other devices associated with PTD 110 described in regard to FIG. 1, such as a smart key, a smart fob, or a mobile device, among others. In various embodiments, a combination of different biometric devices may be used to function as PTD 110. In various embodiments, PTD 110B may be able to communicate and conduct transactions with TPS 130B without interface device 120, as illustrated in FIG. 1B. In various embodiments, PTD 110B may include a smart card, similar to card 200, without contactless communication capability, and a card carrier designed to enable card 200 to conduct contactless communication with TPS 130B, such as the smart card system disclosed in "Smart Card Systems Comprising a Card and a Carrier," which is incorporated herein by reference.

In various embodiments, the authentication process illustrated in FIG. 4 may be performed by more than one entity. For example, take transaction system 150 illustrated in FIG. 1B. In various embodiments, PTD 110B may be a smartphone equipped with a fingerprint scanner in communication with TPS 130B over network 140B. The smartphone may be configured to perform operation 402 of FIG. 4, querying the user to enter fingerprint images in a first sequence using the fingerprint scanner and generating the fingerprint templates. The smartphone can then transmit those fingerprint images or fingerprint templates to TPS 1308 for back-end performance of operations 404-412. In other embodiments, the smartphone may only obtain the fingerprint images entered by the user in a first sequence and transmit those fingerprint images for generation of fingerprint templates by TPS 130B, in accordance with the description above regarding FIG. 4. In various embodiments involving the transaction system 100 of FIG. 1A, the operations of FIG. 4 may be performed by one or more of TPS 130, PTD, 110, interface device 120, or any combination thereof.

Figure 5:
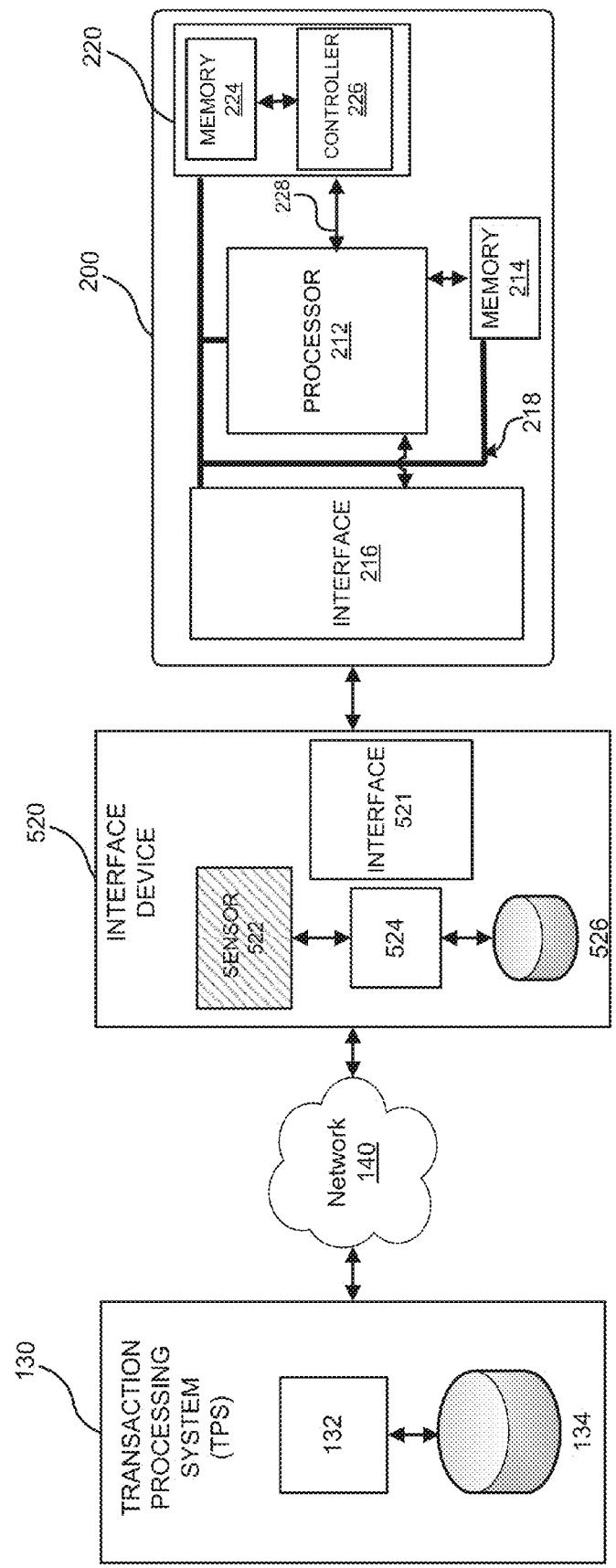
FIG. 5 is another example diagram of a transaction using a personal transaction device in accordance with the technology disclosed herein.

Although shown in FIGS. 2 and 3 as being part of card 200, one or more components of the biometric authentication module 220 may be included within other devices within the system. As shown in FIG. 5, interface device 520 may include the same components as interface device 120, in addition to a biometric scanner 522 (e.g., a fingerprint scanner). Interface device 520 may be implemented with card 200, or with other smart card embodiments that do not include the biometric authentication module 220 of card 200. In the illustrated embodiment of FIG. 5, the biometric scanning functions described above in regards to the biometric authentication module 220 are performed by biometric scanner 522 in interface device 520. In various embodiments, biometric sensor 222 on card 200 may still be able to communicate with controlled 226, allowing an unauthenticated user to input fingerprint images in accordance with the example process of FIG. 4 using either scanner. In other embodiments, interface device 520 may communicate with processing module 212 and request that biometric sensor 222 be deactivated while the transaction is occurring. In other embodiments, biometric sensor 222 may not be included in card 200.

The authentication process would proceed in the same way as discussed above in regard to FIG. 4, except that the fingerprint images used to generate the one or more fingerprint templates associated with a person requesting a transaction would be inputted through sensor 522 of interface device 520 and transmitted to card 200 through interface 521 for authentication processing. In other embodiments, interface device 520 may conduct the authentication processing as well. In such embodiments, processing module 524 may perform the functions of controller 226. In other embodiments, data storage device 526 may be configured to act like authentication memory 224, storing the set of fingerprint templates associated with a registered user in the second sequence as discussed above with regards to operation 404. In some embodiments, all the components of biometric authentication module 220 may be included in interface device 520, and card 200 may not include a biometric authentication module.

As discussed above, the authentication process includes a set of fingerprint templates associated with a registered user in a second sequence stored on a memory of the transaction system. This set of fingerprint templates is obtained and identified during an enrollment process. A registered user's fingerprint templates and a verification sequence are created during the period. The implementation of an enrollment period depends on the operator of the transaction system, such as the bank managing the user's account. The operator may have a single enrollment period at the time a biometric device, like PTD 110 and card 200, is enrolled in the system. In various embodiments, an operator may allow a registered user to enroll a new or additional user after the biometric device has already been enrolled.

Figure 6:
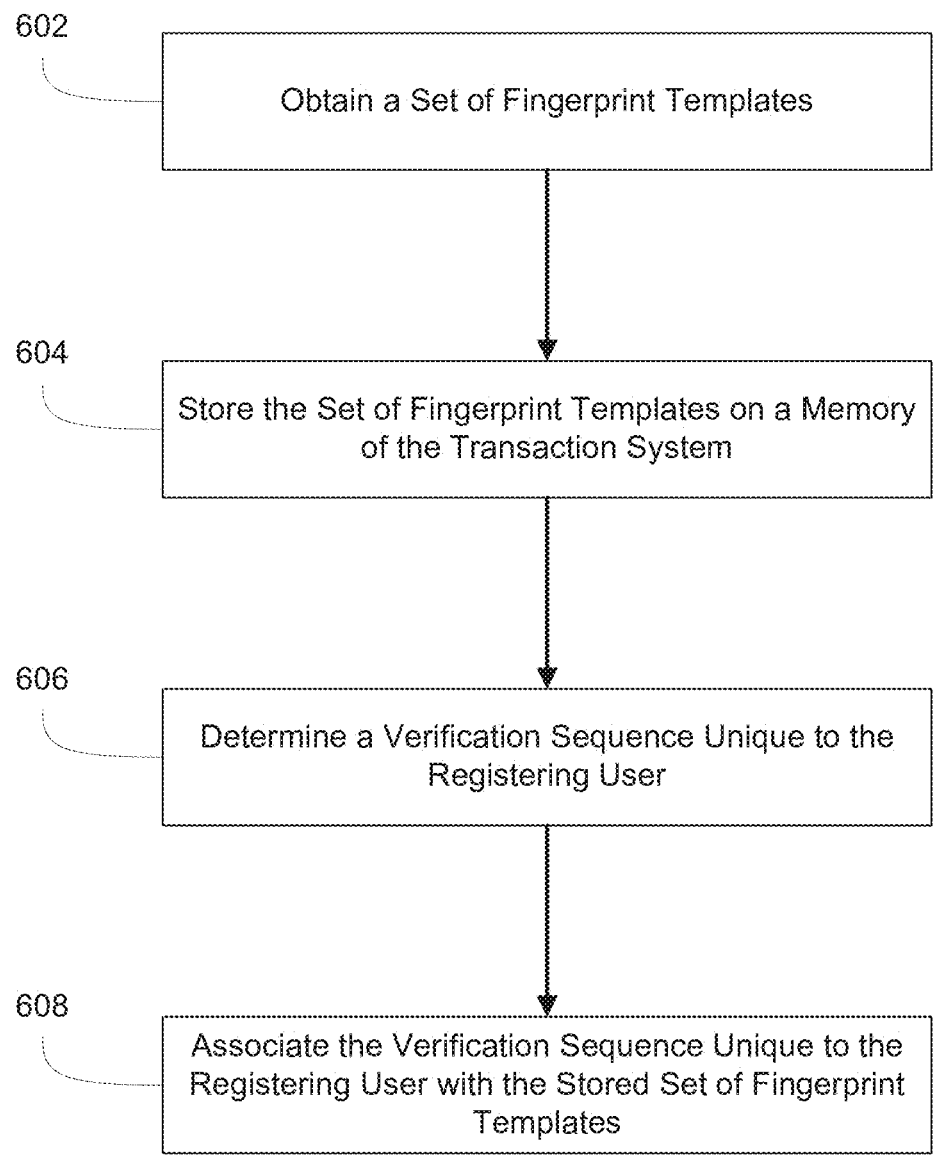
FIG. 6 is an example flowchart of an enrollment process in accordance with the technology disclosed herein.

An example enrollment process is described in reference to FIG. 6. This is only an example enrollment process, and should not be read to limit the present disclosure.

At operation 602, a set of fingerprint templates associated with a registering user are obtained. The fingerprint templates can be generated from a set of fingerprint images of the registering user by processing (e.g., extracting, focusing, aligning, rotating, scaling, normalizing and/or formatting) the fingerprint images. The set of fingerprint images can be obtained using a fingerprint scanner. In various embodiments, the enrollment process may be directed at enrolling a smart card, smart key, smart fob, a mobile device, or a combination thereof with the transaction system.

In various embodiments, the fingerprint scanner used to obtain the fingerprint templates may be a fingerprint scanner embedded on the smart card, smart key, or smart fob. In some embodiments, the fingerprint scanner may be included in a mobile device (e.g., smart phone, PDA, tablet, laptop, portable POS terminal) used for conducting transaction, both with or without an interface device like interface device 120. The fingerprint scanner within the mobile device may be a physical component, such as an image scanner or touch sensitive pad, or could be an application utilizing other components of the mobile device, such as an application that scans fingerprint images using a touch screen of the mobile device or through a camera included in the mobile device. In other embodiments, the fingerprint scanner used could be a fingerprint scanner included within a transaction terminal connected to the transaction system. In other embodiments, the fingerprint templates may be obtained via a standalone fingerprint scanner connected to the transaction system at a transaction system's operator's enrollment location, such as a bank branch.

In various embodiments, the set of fingerprint templates obtained may include only a subset of fingerprint templates associated with the registering user. For example, the set of fingerprint templates may include templates for only the registering user's ring, middle, and index fingers on the left hand, and only the thumb and index finger on the right hand. In other embodiments, a different grouping of fingers between the registering user's two hands may be used. In various embodiments, the set of fingerprint templates may be limited to a threshold amount of templates. In various embodiments, the set of fingerprint templates may be limited to the fingerprints of a single hand.

In various embodiments, the set of fingerprint templates may be obtained during an enrollment period. The enrollment period may be the initial period in which a user or user's account is registered with the transaction system. In various embodiments, the enrollment period may occur only once, prior to the user being able to conduct any transactions. In other embodiments, the registering user may be able to re-enroll at a later time, such as when a new authorized user must be added to the account or a new biometric device is to be registered. In various embodiments, the fingerprint templates may be obtained prior to the enrollment process. For example, the registering user may provide fingerprint templates prior to the date of enrollment for processing purposes, or the fingerprint templates may be obtained from another stored set of fingerprint templates associated with the registering user.

At operation 604, the set of fingerprint templates are stored on a memory of the transaction system. Storage of the fingerprint templates allows retrieval of the fingerprint templates for authentication purposes prior to completing a transaction, such as for use in the authentication process discussed above. The memory of the transaction system may be any compatible data storage component, such as a read-only memory (ROM), such as EPROM or EEPROM, flash, a hard disk, a database, or any other storage component capable of storing executory programs and information. In various embodiments, the set of fingerprint templates may be stored on a memory of a smart card or mobile device. In other embodiments, the set of fingerprint templates may be stored on a memory of a transaction terminal, such as a POS terminal. In other embodiments, the set of fingerprint templates may be stored on a data storage device of the transaction system, such as a central database. In various embodiments, the set of fingerprint templates may be stored in more than one location to ensure that the templates may be retrieved for authentication purposes.

At operation 606, a verification sequence is determined that is unique to the registering user. The verification sequence comprises a pattern of entry of a registering user's fingerprints, similar to a personal identification number (PIN) or passcode. Instead of entering a numerical code, an unauthenticated user must provide fingerprint images in an ordered pattern dictated by the verification sequence. For example, if the verification sequence unique to the individual is "ring finger, thumb, index finger," the unauthenticated user must first provide an image of his or her ring finger, then the thumb, then the index finger. If not entered correctly, the authentication process fails. The example sequence used was simplified for explanatory purposes and should not be read to limit the embodiments of the present disclosure.

In various embodiments, the verification sequence may be determined based on the ordered sequence in which the fingerprint templates were obtained. In other embodiments, the verification sequence may be chosen by the registering user (e.g., from a list of fingerprint images or fingers to the user) before or after the set of fingerprint templates are obtained. In other embodiments, the verification sequence may be provided or suggested by the operator of the transaction system. In various embodiments, the verification sequence may be stored on a memory of the transaction system in the same way as the set of fingerprint templates discussed above with regards to operation 604.

At operation 608, the verification sequence is associated with the set of fingerprint templates associated with the registering user. In various embodiments, the verification sequence may be formatted as numerical values, such as the first entry is "one", the second "two", etc. For example, taking the simplified verification sequence discussed above, the registering user's ring finger template would be "one," the thumb would be "two," and the index finger "three." Accordingly, when an unauthenticated user enters a fingerprint sequence, the corresponding templates can be retrieved based on the image to which it is compared: the first entered fingerprint is compared against template "one," the second entered fingerprint against template "two," etc. In other embodiments, the verification sequence may be associated with the fingerprint templates by ordering the fingerprint templates based on the verification sequence. In various embodiments, the verification sequence may be associated with corresponding fingerprint templates, such as the two fingerprint templates associated with a registering user's ring fingers (one for each hand). The associated verification sequence represents the second sequence associated with a registered user referenced above in regards to operation 404 of FIG. 4.

Although the example verification sequence discussed above speaks simply of images of a particular finger, the sequence may include additional identifiers. In various embodiments, the verification sequence may refer to the specific hand associated with the specific fingerprint template.

Although described as an enrollment process, the process of FIG. 6 may be used outside of the initial enrollment process to allow a registering user greater control over the account. In various embodiments, the process may be used to allow a registering user to change an already registered verification sequence. In such embodiments, one or more of the operations may be omitted, such as obtaining the set of fingerprint templates.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

Figure 7:
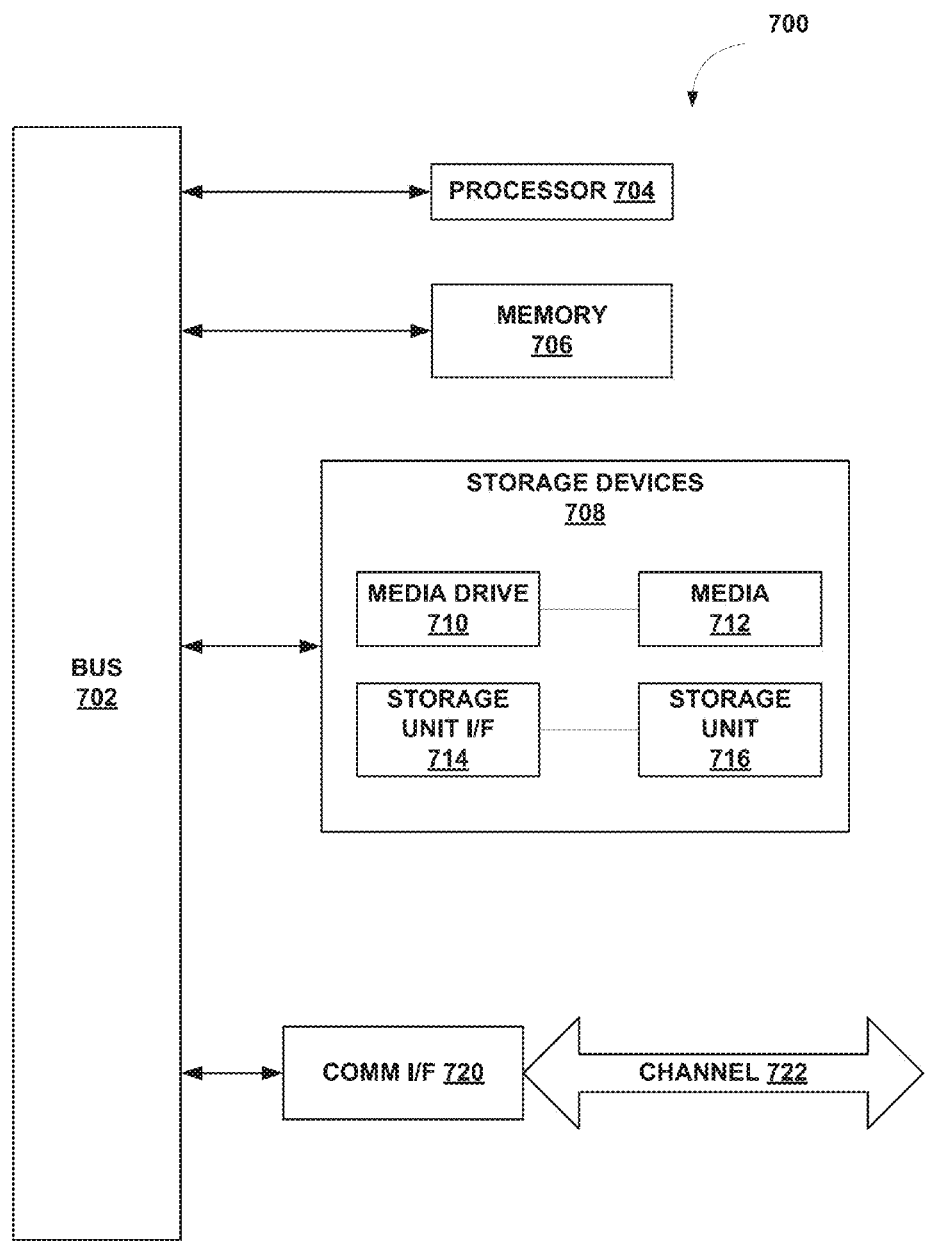
FIG. 7 is an example diagram of a computing module that may be used in implementing various features of embodiments of the technology disclosed herein.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 700. After reading this description, it will become apparent to a person skilled in the relevant art how to implement the technology using other computing modules or architectures.

Referring now to FIG. 7, computing module 700 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 706. For example, preferably random access memory (RAM) or other dynamic memory, might be used for storing information and instructions to be executed by processor 704. Main memory 706 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 708, which might include, for example, a media drive 710 and a storage unit interface 714. The media drive 710 might include a drive or other mechanism to support fixed or removable storage media 712. For example, a hard disk drive, a floppy disk drive, a magnetic tape drive, an optical disk drive, a CD or DVD drive (R or RW), or other removable or fixed media drive might be provided. Accordingly, storage media 712 might include, for example, a hard disk, a floppy disk, magnetic tape, cartridge, optical disk, a CD or DVD, or other fixed or removable medium that is read by, written to or accessed by media drive 710. As these examples illustrate, the storage media 712 can include a computer usable storage medium having stored therein computer software or data.

In alternative embodiments, information storage mechanism 708 might include other similar instrumentalities for allowing computer programs or other instructions or data to be loaded into computing module 700. Such instrumentalities might include, for example, a fixed or removable storage unit 716 and an interface 714. Examples of such storage units 716 and interfaces 714 can include a program cartridge and cartridge interface, a removable memory (for example, a flash memory or other removable memory module) and memory slot, a PCMCIA slot and card, and other fixed or removable storage units 716 and interfaces 714 that allow software and data to be transferred from the storage unit 716 to computing module 700.

Computing module 700 might also include a communications interface 720. Communications interface 720 might be used to allow software and data to be transferred between computing module 700 and external devices. Examples of communications interface 720 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 720 might typically be carried on signals, which can be electronic, electromagnetic (which includes optical) or other signals capable of being exchanged by a given communications interface 720. These signals might be provided to communications interface 720 via a channel 722. This channel 722 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 706, storage unit 716, media 712, and channel 722. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

We claim:

1. A method of enhancing biometric security, comprising:
   during an enrollment period for an electronic transaction system:
      obtaining a first set of fingerprint templates associated with a registering user, wherein the first set of fingerprint templates are generated from a first set of fingerprint images entered by the registering user,
      storing the first set of fingerprint templates in a memory of the electronic transaction system,
      determining a verification sequence unique to the registering user based on an order in which the first set of fingerprint images are entered by the registering user, wherein at least some of the fingerprint images in the first set of fingerprint images are associated with different fingers of the registering user, and
      associating the verification sequence with the stored first set of fingerprint templates to be used for a subsequent authentication of the registering user; and
   during a subsequent authentication process for the electronic transaction system:
      obtaining a second set of fingerprint templates associated with a party requesting a new transaction, the second set of fingerprint templates generated from a second set of fingerprint images entered by the party requesting the new transaction in a second sequence based on an order in which the second set of finger print images are entered,
      retrieving the first set of fingerprint templates associated with the registering user from the memory,
      comparing the second set of fingerprint templates according to the second sequence to the first set of fingerprint templates according the verification sequence, and
      determining whether there is a match between the verification sequence and the second sequence.

2. The method of claim 1, wherein the first set of fingerprint images are entered by the registering user via a fingerprint scanner.

3. The method of claim 2, wherein the fingerprint scanner used to obtain the first set of fingerprint images is embedded on a smart card, and the first set of fingerprint templates is stored in a memory of the smart card.

4. The method of claim 3 further comprising storing the verification sequence in the memory of the smart card.

5. The method of claim 2, wherein the fingerprint scanner used to obtain the first set of fingerprint images is included in a terminal connected to the transaction system.

6. The method of claim 5, wherein the memory of the transaction system comprises a memory of the terminal connected to the transaction system.

7. A method of authenticating a registered user in an electronic transaction system, comprising:

obtaining a second set of fingerprint templates associated with a party requesting a new transaction via a fingerprint scanner, the second set of fingerprint templates associated with the party generated from a second set of fingerprint images entered by the party in a second sequence;

comparing the second set of fingerprint templates associated with the party to a first set of fingerprint templates associated with a registered user and a verification sequence unique to a registered user, the first set of fingerprint templates generated from a first set of fingerprint images entered by the registered user and the verification sequence determined from an order in which the first set of fingerprint images are entered during an enrollment process, wherein at least some of the fingerprint images in the first set of fingerprint images are associated with different fingers of the registered user; and determining whether there is a match between the verification sequence and the second sequence.

8. The method of claim 7, wherein the party requests the new transaction using a smart card comprising one or more processing modules and a memory, and the smart card is in communication with the electronic transaction system through a terminal connected to the electronic transaction system.

9. The method of claim 8, wherein the fingerprint scanner is embedded on the smart card.

10. The method of claim 9, wherein the first set of fingerprint templates associated with the registered user is stored on the memory of the smart card.

11. The method of claim 10, wherein the determining step is performed at the terminal.

12. The method of claim 8, wherein the fingerprint scanner is part of the terminal.

13. The method of claim 12, wherein the determining step is performed at the smart card, and the second set of fingerprint images entered by the party in the second sequence are entered via the fingerprint scanner at the terminal.

14. The method of claim 12, wherein the determining step is performed at the terminal, and the method further comprising accessing the memory on the smart card and retrieving the first set of fingerprint templates associated with the registered user.

15. The method of claim 7, wherein the party requests the new transaction using a mobile device connected to the transaction system over a wireless network connection, and the fingerprint scanner is part of the mobile device.

16. The method of claim 15, wherein the first set of fingerprint templates associated with the registered user are stored on a memory of the mobile device.

17. The method of claim 7, wherein the requested new transaction comprises one or more of the following: a sale or purchase; a credit or debit transaction; access to a restricted area within a facility; access to a computing device; access to a computer network through an access terminal, wherein the access terminal is a computing device.

18. The method of claim 17, wherein the computing device comprises one or more of the following: a smartphone, a tablet computer, a laptop, a PC.

19. An electronic transaction system, comprising:

a fingerprint scanner configured to obtain a second set of fingerprint images entered by a party requesting a new transaction-in a second sequence;

a memory for storing a first set of fingerprint templates associated with a registered user and a verification sequence unique to the registered user, the first set of fingerprint templates generated from a plurality of fingerprint images entered by the registered user during an enrollment process, wherein the verification sequence is determined based on an order in which the first set of fingerprint images are entered by the registered user during the enrollment period, wherein at least some of the fingerprint images in the first set of fingerprint images are associated with different fingers of the registered user; and one or more processing modules communicatively coupled to the memory and the fingerprint scanner and configured to: generate a second set of fingerprint templates associated with the party from the second set of fingerprint images entered by the party via the fingerprint scanner, compare the second set of fingerprint templates associated with the party and the second sequence to the first set of templates associated with the registered user and the verification sequence, and determine whether there is a match between the verification sequence and the second sequence.

* * * * *